(12) United States Patent
Evans et al.

(10) Patent No.: US 9,797,269 B2
(45) Date of Patent: Oct. 24, 2017

(54) GAS TURBINE ENGINE

(71) Applicant: ROLLS-ROYCE PLC, London (GB)

(72) Inventors: Dale Edward Evans, Derby (GB);
Mickael Drozdz, Derby (GB); David Laker Christmas, Bristol (GB)

(73) Assignee: ROLLS-ROYCE plc, London (GB)

( * ) Notice: Subject to any disclaimer, the term of this patent is extended or adjusted under 35 U.S.C. 154(b) by 365 days.

(21) Appl. No.: 14/593,418

(22) Filed: Jan. 9, 2015

(65) Prior Publication Data
US 2015/0218961 A1    Aug. 6, 2015

(30) Foreign Application Priority Data

Jan. 31, 2014  (GB) .................................. 1401660.4
Mar. 27, 2014  (GB) .................................. 1405502.4

(51) Int. Cl.
*F01D 21/04*   (2006.01)
*F01D 25/24*   (2006.01)

(52) U.S. Cl.
CPC .......... *F01D 21/045* (2013.01); *F01D 25/243* (2013.01); *F05D 2220/36* (2013.01); *F05D 2240/14* (2013.01); *Y02T 50/672* (2013.01)

(58) Field of Classification Search
CPC ...... F01D 21/045; F01D 11/12; F01D 11/122; F01D 11/125; F01D 11/127; F01D 25/243; F05D 2240/14; F05D 2220/36
(Continued)

(56) References Cited

U.S. PATENT DOCUMENTS 3,796,437 A  *  3/1974  Nickly ................... F16B 43/02
                                                                277/637
4,149,824 A  *  4/1979  Adamson .............. F01D 21/006
                                                                415/197
(Continued)

FOREIGN PATENT DOCUMENTS

EP       1 589 195 A1     10/2005
EP       2 495 400 A2      9/2012
(Continued)

OTHER PUBLICATIONS

Jun. 22, 2015 Extended Search Report issued in European Patent Application No. 15150476.8.
(Continued)

*Primary Examiner* — Christopher Verdier
(74) *Attorney, Agent, or Firm* — Oliff PLC

(57) ABSTRACT

Fan containment system fitting around an array of radially extending fan blades mounted on a hub in an axial gas turbine engine. The fan containment system includes a fan case having an annular casing element for encircling the array of fan blades and a hook projecting in a radially inward direction from the annular casing element and positioned axially forward of the array of fan blades when the fan containment system fitted around fan blades. An annular fan track liner positioned substantially coaxial to the annular casing element. Clamping arrangement connects fan track liner to the hook. Clamping arrangement is configured under the condition that a fan blade impacts the fan track liner, the clamping arrangement releases connection between the hook and a portion of fan track liner so that a portion of the fan track liner can move towards the annular casing element to encourage the fan blade to impact the hook.

19 Claims, 16 Drawing Sheets

(58) Field of Classification Search
USPC ...... 415/9, 173.4, 174.4, 197, 200; 411/535,
411/537, 538, 539, 230, 274, 275, 936;
403/374.1, 409.1
See application file for complete search history.

(56) References Cited

U.S. PATENT DOCUMENTS

| | | | | |
|---|---|---|---|---|
| 4,177,999 | A * | 12/1979 | Raber | F16B 43/001 |
| | | | | 277/637 |
| 5,267,828 | A * | 12/1993 | Lenhart | F01D 25/246 |
| | | | | 411/353 |
| 6,120,242 | A * | 9/2000 | Bonnoitt | F01D 11/127 |
| | | | | 415/174.4 |
| 2003/0156940 | A1 * | 8/2003 | Czachor | F01D 21/045 |
| | | | | 415/119 |
| 2011/0044806 | A1 | 2/2011 | Harper | |

FOREIGN PATENT DOCUMENTS

| | | |
|---|---|---|
| EP | 2 620 652 A1 | 7/2013 |
| EP | 2 620 654 A1 | 7/2013 |
| WO | 2008/006960 A2 | 1/2008 |

OTHER PUBLICATIONS

Search Report issued in United Kingdom Patent Application No. GB1405502.4 dated Nov. 13, 2014.
Search Report issued in United Kingdom Patent Application No. GB1401660.4 dated Sep. 15, 2014.

* cited by examiner

GAS TURBINE ENGINE

FIELD OF INVENTION

The invention relates to a fan containment system, a casing assembly, a fan and/or a gas turbine engine.

BACKGROUND

Turbofan gas turbine engines (which may be referred to simply as 'turbofans') are typically employed to power aircraft. Turbofans are particularly useful on commercial aircraft where fuel consumption is a primary concern. Typically a turbofan gas turbine engine will comprise an axial fan driven by an engine core. The engine core is generally made up of one or more turbines which drive respective compressors via coaxial shafts. The fan is usually driven directly off an additional lower pressure turbine in the engine core.

The fan comprises an array of radially extending fan blades mounted on a rotor and will usually provide, in current high bypass gas turbine engines, around seventy-five percent of the overall thrust generated by the gas turbine engine. The remaining portion of air from the fan is ingested by the engine core and is further compressed, combusted, accelerated and exhausted through a nozzle. The engine core exhaust mixes with the remaining portion of relatively high-volume, low-velocity air bypassing the engine core through a bypass duct.

To satisfy regulatory requirements, such engines are required to demonstrate that if part or all of a fan blade were to become detached from the remainder of the fan, that the detached parts are suitably captured within the engine containment system.

The fan is radially surrounded (or circumscribed) by a fan casing. It is known to provide the fan casing with a fan track liner and a containment system designed to contain any released blades or associated debris. Often, the fan track liner can form part of the fan containment system.

The fan track liner typically includes an annular layer of abradable material which surrounds the fan blades. During operation of the engine, the fan blades rotate freely within the fan track liner. At maximum speed the blades may cut a path into this abradable layer creating a seal against the fan casing and minimising air leakage around the blade tips during cruise. Further incursions can occur during gusts or take off rotations over time.

Swept fan blades are increasingly used in turbofan engines as they offer significant advantages in efficiency over conventional fan blades. Swept fan blades have a greater chord length at their central portion than conventional fan blades. This greater chord length means that ice that forms on a swept fan blade follows the same rearward and outward path as on a conventional fan blade but may reach a radially outer tip of the blade before it reaches the trailing edge. The ice will therefore be shed from the blade tip and may strike the fan track liner within the blade off zone (that is the region where a blade would contact the fan track liner in the event of a blade being detached from the fan).

A fan track liner used with a swept fan blade is therefore required to be strong enough to resist ice impact whilst allowing a detached fan blade to penetrate and be contained therewithin.

In recent years there has been a trend towards the use of lighter fan blades, which are typically either of hollow metal or of composite construction. These lighter fan blades have similar impact energy per unit area as an ice sheet, which makes it more difficult to devise a casing arrangement that will resist the passage of ice and yet not interfere with the trajectory of a released fan blade.

A conventional fan containment system or arrangement 100 is illustrated in FIG. 1 and surrounds a fan comprising an array of radially extending fan blades 40. Each fan blade 40 has a leading edge 44, a trailing edge 45 and fan blade tip 42. The fan containment arrangement 100 comprises a fan case 150. The fan case 150 has a generally frustoconical or cylindrical annular casing element 152 and a hook 154. The hook 154 is positioned axially forward of an array of radially extending fan blades 40. A fan track liner 156 is mechanically fixed or directly bonded to the fan case 150. The fan track liner 156 may be adhesively bonded to the fan case 150. The fan track liner 156 is provided as a structural intermediate to bridge a deliberate gap provided between the fan case 150 and the fan blade tip 42.

The fan track liner 156 has, in circumferential layers, an attrition liner 158 (also referred to as an abradable liner or an abradable layer), an intermediate layer which in this embodiment is a honeycomb layer 160, and a septum layer 162. The septum layer 162 acts as a bonding, separation, and load spreading layer between the attrition liner 158 and the honeycomb layer 160. The honeycomb layer 160 may be an aluminium honeycomb. The tips 42 of the fan blades 40 are intended to pass as close as possible to the attrition liner 158 when rotating. The attrition liner 158 is therefore designed to be abraded away by the fan blade tips 42 during abnormal operational movements of the fan blade 40 and to just touch during the extreme of normal operation to ensure the gap between the rotating fan blade tips 42 and the fan track liner 156 is as small as possible without wearing a trench in the attrition liner 158. During normal operations of the gas turbine engine, ordinary and expected movements of the fan blade 40 rotational envelope cause abrasion of the attrition liner 158. This allows the best possible seal between the fan blades 40 and the fan track liner 156 and so improves the effectiveness of the fan in driving air through the engine.

The purpose of the hook 154 is to ensure that, in the event that a fan blade 40 detaches from the rotor of the fan 12, the fan blade 40 will not be ejected through the front, or intake, of the gas turbine engine. During such a fan-blade-off event, a released fan blade 40 continues to travel in the direction of travel at the point of release, so substantially travels tangentially to a circumference defined by rotation of the fan. Impact with the containment system (including the fan track liner 156) of the fan case 150 prevents the released fan blade 40 from travelling any further in a radially outward direction relative to the circumference defined by rotation of the fan. The fan blade 40 will also move forwards in an axial direction. This axially forward and radially outward motion results in the fan blade 40 colliding with the hook 154. Thus the fan blade 40 is held by the hook 154 and further axially forward movement is prevented. A trailing blade (not shown) then forces the held released blade rearwards where the released blade is contained. Thus the fan blade 40 is unable to cause damage to structures outside of the gas turbine engine casings.

As can be seen from FIG. 1, for the hook 154 to function effectively, a released fan blade 40 must penetrate the attrition liner 158 in order for its forward trajectory to intercept with the hook. If the attrition liner 158 is too hard then the released fan blade 40 may not sufficiently crush the fan track liner 156.

However, the fan track liner 156 must also be stiff enough to withstand the rigours of normal operation without sustaining damage. This means the fan track liner 156 must be strong enough to withstand ice and other foreign object impacts without exhibiting damage for example. Thus there is a design conflict, where on one hand the fan track liner 156 must be hard enough to remain undamaged during normal operation, for example when subjected to ice impacts, and on the other hand allow the tip 42 of the fan blade 40 to penetrate the attrition liner 158. It is a problem of balance in making the fan track liner 156 sufficiently hard enough to sustain foreign object impact, whilst at the same time, not be so hard as to alter the preferred hook-interception trajectory of a fan blade 40 released from the rotor. Ice that impacts the fan casing rearwards of the blade position is resisted by a reinforced rearward portion 164 of the fan track liner.

An alternative fan containment system is indicated generally at 200 in FIG. 2. The fan containment system 200 includes a fan track liner 256. The fan track liner 256 has, in circumferential layers, an attrition liner 258, an intermediate layer 260, and a septum 262. The fan track liner 256 that is connected to the fan casing 250 at both an axially forward position and an axially rearward position. At the axially forward position, the fan track liner 256 is connected to the casing at hook 254 via a fastener 266 that is configured to fail at a predetermined load. In the event of a fan blade detaching from the remainder of the fan, the fan blade impacts the fan track liner 256, the fastener 266 fails and the fan track liner pivots about a rearward point on the fan track liner. Such an arrangement is often referred to as a trap door arrangement. The trap door arrangement has been found to help balance the requirements for stiffness of the fan track liner with the requirements for resistance of operational impacts (e.g. ice impacts) ensuring a detached blade is held within the engine.

SUMMARY OF INVENTION

The present invention seeks to improve the integrity of a fan containment system. The structural integrity of the hook is important to improve the reliability of the fan containment system in a fan blade off event.

One way to improve the structural integrity of the hook would be to increase the thickness of the hook and/or make the hook from a stiffer material, but both these changes would undesirably increase the weight of the fan containment system. Furthermore, both these changes may affect the performance of the containment system in a fan blade off scenario and/or there may be limited space in the containment system to make changes to the hook design.

In a first aspect the invention provides a fan containment system for fitment around an array of radially extending fan blades mounted on a hub in an axial gas turbine engine. The fan containment system comprises a fan case having an annular casing element for encircling an array of fan blades and a hook projecting in a generally radially inward direction from the annular casing element and positioned axially forward of an array of fan blades when the fan containment system is fitted around said fan blades. An annular fan track liner is positioned substantially coaxial to the annular casing element. A clamping arrangement connects the fan track liner to the hook. The clamping arrangement is configured such that under the condition that a fan blade impacts the fan track liner, the clamping arrangement substantially releases the connection between the hook and a portion of the fan track liner so that at least a portion of the fan track liner can move towards the annular casing element so as to encourage the released fan blade to impact the hook.

The use of a clamping arrangement mitigates the risk of the integrity of the hook being damaged when the fan blade impacts the fan track liner, so that the likelihood of containment of a released fan blade is improved. Unlike conventional methods of connecting the fan track liner to the hook, the clamping arrangement does not require holes to be formed in the hook to receive a fastener, and as such the risk of the hook cracking is reduced. Reducing the risk of the hook cracking mitigates the risk of a fan blade not being contained in a fan blade off event and also, in a worst case scenario, mitigates the risk of cracking from the fastener hole propagating to the main body of the casing (e.g. the annular casing element).

Tests carried out on selected embodiments have found that the clamping arrangement does not interfere with the movement of the fan track liner towards the annular casing element in a fan blade off scenario, and vibration integrity is maintained during normal operation.

The clamping arrangement may connect a leading edge of the fan track liner to the hook. The clamping arrangement may be configured to limit radial movement of the fan track liner in both a radially inward and radially outward direction. The clamping arrangement may be a component distinct from the hook.

The clamping arrangement may comprise a first member radially opposing a second member, the hook being positioned (or sandwiched) between the first member and the second member. For example, the clamping arrangement may comprise a clamp having a first jaw and a second jaw, the hook being clamped between the first jaw and the second jaw.

At least a portion of a component of the clamping arrangement may be configured to fail (e.g. deform, shear or fracture) when a fan blade impacts the fan track liner.

The clamping arrangement may comprise a first clamping member positioned radially outward of the hook and a second clamping member positioned radially inward of the hook, the hook being clamped between the first clamping member and the second clamping member. The area of overlap between the second clamping member and the hook may be selected to control the timing of when at least a portion of the fan track liner panel moves towards the annular casing element in a fan blade off scenario.

The clamping arrangement may comprise a connector connecting the first clamping member and the second clamping member to the fan track liner.

The second clamping member may be configured to fail (e.g. fracture, deform or shear) when a fan blade impacts the fan track liner. Alternatively, in embodiments where the clamping arrangement comprises a connector connecting the first clamping member and the second clamping member to the fan track liner, the connector may be configured to fail (e.g. deform, shear or fracture) when a fan blade impacts the fan track liner.

The fan track liner may comprise a tray proximal to the annular casing element. The fan track liner may comprise an intermediate layer connected (e.g. bonded) to the tray. The fan track liner may comprise an attrition layer proximal, in use, to the fan blades. The fan track liner may comprise a septum layer substantially radially between the intermediate layer and the attrition layer.

The first clamping member may comprise a portion of the septum layer and/or the tray.

In exemplary embodiments, the connector that connects the first clamping member and second clamping member to the fan track liner may be part of the fan track liner. For example, the connector may be defined by the septum layer.

The hook may comprise an undercut that accommodates at least a portion of the second clamping member. Provision of an undercut can reduce any steps in the gas washed surface of the fan containment system, and/or help to ensure that any steps are radially outward in an axial flow direction so as to reduce disturbance to airflow along the gas washed surface of the fan containment system.

The first clamping member may be connected to the second clamping member via one or more fasteners (e.g. a bolt and a nut, the nut may have an anti-rotation feature). The one or more fasteners may be spaced from the hook. Spacing the fasteners from the hook means that the fastener does not interfere with the hook.

The fastener may extend through at least a portion of the fan track liner (e.g. through the attrition layer and/or the septum layer and/or the intermediate layer and/or the tray).

Recesses may be formed in a radially outer surface of the fan track liner to accommodate the fastener. For example, the recesses may be cut-away sections or depressions. Provision of such recesses can reduce or eliminate the protrusion of the fasteners from a nominal profile of the fan track liner so as to limit any impact of the fasteners on the operation of the fan containment system in a fan blade off scenario.

An insert may be provided in the fan track liner for receiving the fastener. For example, the insert may extend through the radial thickness of the fan track liner, e.g. the insert may have a thickness substantially equal to the intermediate layer, septum layer and/or the attrition layer. For example, the insert may extend to the tray of the fan track liner. The thickness and dimensions of the insert may be selected to further improve vibration integrity.

The first clamping member may comprise a plate bonded to at least a portion of the fan track liner, for example using an adhesive such as an epoxy resin. In embodiments where the fan track liner comprises an intermediate layer that has a honeycomb structure, at least a portion of the honeycomb structure may be filled with adhesive, e.g. epoxy resin, in the region of the fastener so as to provide additional strength and sealing.

The first clamping member may comprise at least a portion of a component of the fan track liner.

The first clamping member may comprise a series of discrete circumferentially spaced plates. Additionally or alternatively, the second clamping member may comprise a series of discrete circumferentially spaced plates.

The discrete circumferentially spaced plates may be considered to be tabs.

The spacing between the plates and/or the circumferential thickness of the plates and/or the radial thickness of the plates may be selected to tune the load required to cause at least a portion of the fan track liner to move towards the annular casing element.

Filler material may be provided in any gaps or recessed areas, particularly gaps on a gas washed surface of the fan containment system. For example, filler material may be provided between the second clamping member and the hook (e.g. in a recess defined between an undercut of the hook and a forward face of the second clamping member), and/or over a radially inner surface of the second clamping member.

The first clamping member may comprise a substantially annular plate. Additionally or alternatively, the second clamping member may comprise a substantially annular plate.

The first clamping member may comprise a substantially annular plate profiled in an axial direction so as to form a series of waves. Additionally or alternatively, the second clamping member may comprise a substantially annular plates profiled in an axial direction so as to form a series of waves.

The first and second clamping members may be manufactured from a composite material or a metal material.

The second clamping member may include a radial portion that receives a fastener and a plate portion that abuts against the hook, wherein the radial portion has a greater radial thickness that the plate portion.

The clamping arrangement may include a plate having a lip seated on a radially inward surface of the hook. For example, the second clamping member may include a lip abutting a radially inward surface of the hook.

The fan track liner may have a trap door arrangement. For example, the fan track liner may be pivotally connected to the fan case such that at least a forward portion of the fan track liner pivots towards the fan case when a fan blade impacts the fan track liner.

A voidal region may be provided between at least a forward portion of the fan track liner and the annular casing element. The voidal region may accommodate movement of the fan track liner when a fan blade impacts the fan track liner.

The fan track liner may be defined by a plurality of fan track liner panels. Each fan track liner panel may be connected to the hook by the clamping arrangement.

The clamping arrangement may include a plurality of pairs of first and second clamping members (each pair including one first clamping member and one second clamping member), and one or more of the pairs of first and second clamping members may connect each fan track liner panel to the hook.

The clamping arrangement may comprise at least one pair of cooperating wedge-shaped shims positioned between the clamping members and axially adjacent the hook. The shims may be arranged relative to one another to define a radial spacer between the clamping members.

The shims of each said pair may be arranged relative to one another such that the radial spacer which they define has a radial dimension which is less than the local radial thickness of the adjacent hook.

Said radial dimension of each radial spacer defined by the cooperating shims may be effective to position the second clamping member such that a radially innermost surface of the second clamping member is aerodynamically flush with a radially innermost surface of the hook and/or a radially innermost surface of the fan track liner when the hook is clamped between the first and second clamping members.

The system may have a plurality of said pairs of cooperating shims, said pairs of shims being circumferentially spaced-apart around the fan case.

Each pair of shims may be substantially identical to each other pair of shims.

The shims of each pair may be arranged relative to one another independently of the shims of each other pair, such that the radial thickness of each radial spacer defined by a respective pair of shims is set independently to thereby accommodate any circumferential variation in the radial thickness of the hook.

The shims of each said pair may be each circumferentially tapered, e.g. the shims are tapered so as to have a radial thickness which varies along their circumferential extent.

The shims of each said pair may be configured for circumferential movement relative to one another prior to the hook being clamped between the clamping members, to thereby adjust the radial thickness of the radial spacer defined by the shims.

The shims of each pair each may define a respective contact surface, said contact surfaces being arranged in contact with one another.

The contact surfaces may be arcuate.

The contact surfaces may be roughened.

The shims of each pair may be adhesively bonded together to define a respective radial spacer.

The shims of each pair may be secured to one another by at least one fastener to define a respective radial spacer.

The second clamping member may extend circumferentially around at least a circumferential region of the fan containment system.

In a second aspect the invention provides a fan containment system for fitment around an array of radially extending fan blades mounted on a hub in an axial gas turbine engine. The fan containment system comprises a fan case having an annular casing element for encircling an array of fan blades and a hook projecting in a generally radially inward direction from the annular casing element and positioned axially forward of an array of fan blades when the fan containment system is fitted around said fan blades. The fan containment system comprises an annular fan track liner positioned substantially coaxial to the annular casing element. A clamp is provided, the clamp having a first jaw opposing a second jaw. The hook is clamped between the first and second jaws of the clamp. The clamp is connected to the fan track liner or defines at least a portion of the fan track liner, such that under normal running conditions the clamp substantially fixes the radial position of the fan track liner with respect to the hook, and under the condition that a fan blade impacts the fan track liner, the second jaw is configured to fail so that at least a portion of the fan track liner can move towards the annular casing element so as to encourage the released fan blade to impact the hook.

As will be appreciated by the person skilled in the art, any one, or any combination, of the optional features of the fan containment system of the first aspect are also applicable to the fan containment system of the second aspect.

In a third aspect the invention provides a fan containment system for fitment around an array of radially extending fan blades mounted on a hub in an axial gas turbine engine. The fan containment system comprises a fan case having an annular casing element for encircling an array of fan blades and a hook projecting in a generally radially inward direction from the annular casing element and positioned axially forward of an array of fan blades when the fan containment system is fitted around said fan blades. An annular fan track liner is positioned substantially coaxial to the annular casing element. A clamp is provided, the clamp having a first jaw opposing a second jaw. The hook is clamped between the first and second jaws of the clamp. The clamp is connected to the fan track liner by a connector configured to fail at a predetermined load such that under normal running conditions the clamp substantially fixes the radial position of the fan track liner with respect to the hook, and under the condition that a fan blade impacts the fan track liner the connector fails so that at least a portion of the fan track liner can move towards the annular casing element so as to encourage the released fan blade to impact the hook.

As will be appreciated by the person skilled in the art, any one, or any combination, of the optional features of the fan containment system of the first aspect are also applicable to the fan containment system of the third aspect.

According to a fourth aspect of the present invention, there is provided: a fan containment system for fitment around an array of radially extending fan blades mounted on a hub in an axial gas turbine engine, the fan containment system comprising: a fan case having an annular casing element for encircling an array of fan blades, and a hook projecting in a generally radially inward direction from the annular casing element and positioned axially forward of an array of fan blades when the fan containment system is fitted around said fan blades; an annular fan track liner positioned substantially coaxial to the annular casing element; and a clamping arrangement connecting the fan track liner to the hook, the clamping arrangement comprising a first clamping member positioned radially outward of the hook and a second clamping member positioned radially inward of the hook such that the hook is clamped between the first clamping member and the second clamping member, the clamping arrangement being configured such that under the condition that a fan blade impacts the fan track liner, the clamping arrangement substantially releases the connection between the hook and a portion of the fan track liner so that at least a portion of the fan track liner can move towards the annular casing element so as to encourage the released fan blade to impact the hook, wherein the clamping arrangement further comprises at least one pair of cooperating wedge-shaped shims positioned between the clamping members and axially adjacent the hook, the shims being arranged relative to one another to define a radial spacer between the clamping members.

As will be appreciated by the person skilled in the art the fan containment system of the fourth aspect may have any one or any combination, of the optional features of the fan containment system of the first aspect.

A fifth aspect of the invention provides a casing assembly comprising the fan containment system of any one of the first, second, third or fourth aspects.

A sixth aspect of the invention provides a fan comprising the fan containment system of any one of the first, second, third or fourth aspects.

A seventh aspect of the invention provides a gas turbine engine comprising the fan containment system according to the first, second, third or fourth aspect.

DESCRIPTION OF DRAWINGS

The invention will now be described, by way of example only, with reference to the accompanying drawings in which.

DETAILED DESCRIPTION

Figure 1:
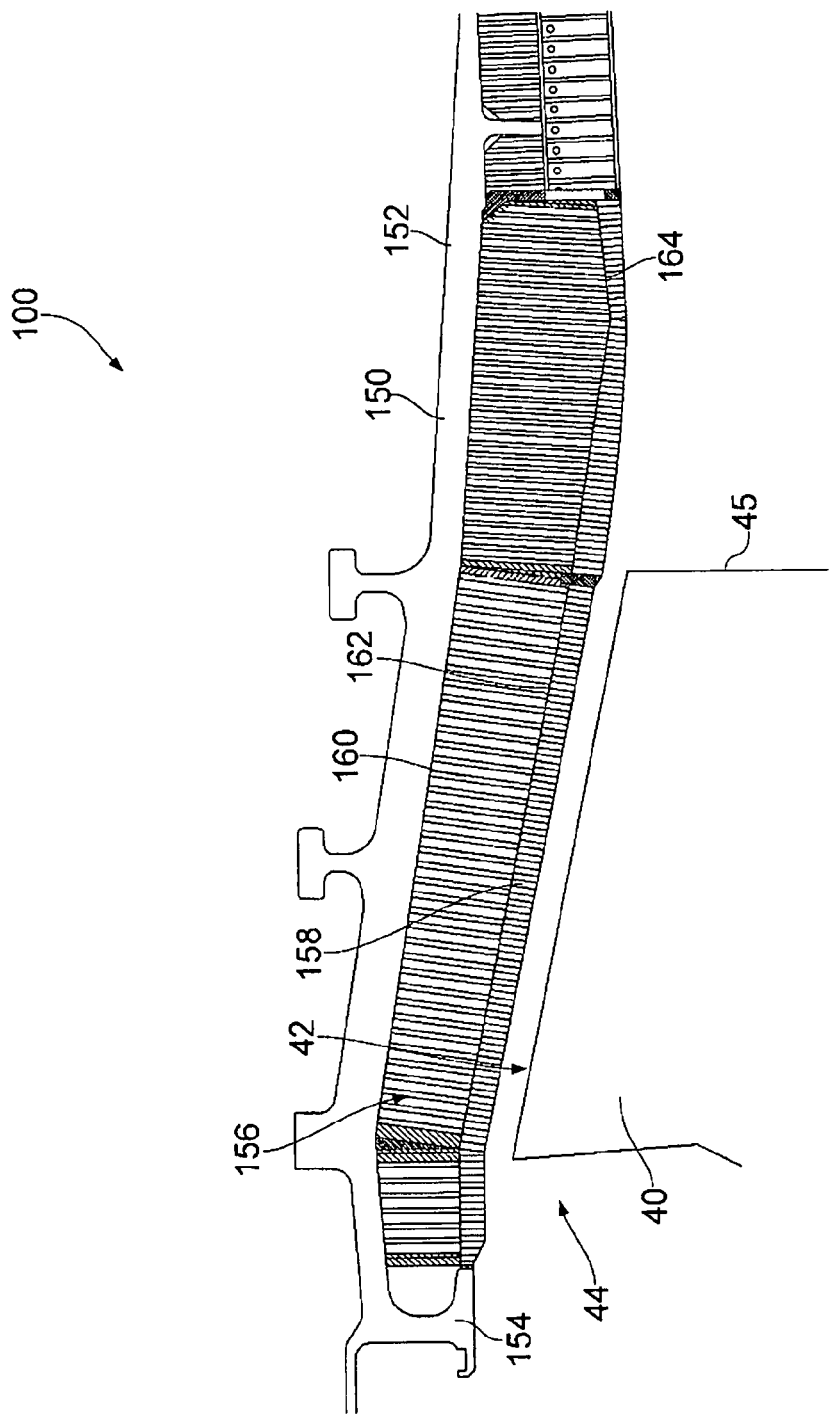
FIG. 1 illustrates a partial view of a cross-section through a typical fan case arrangement of a gas turbine engine of the prior art.
Figure 2:
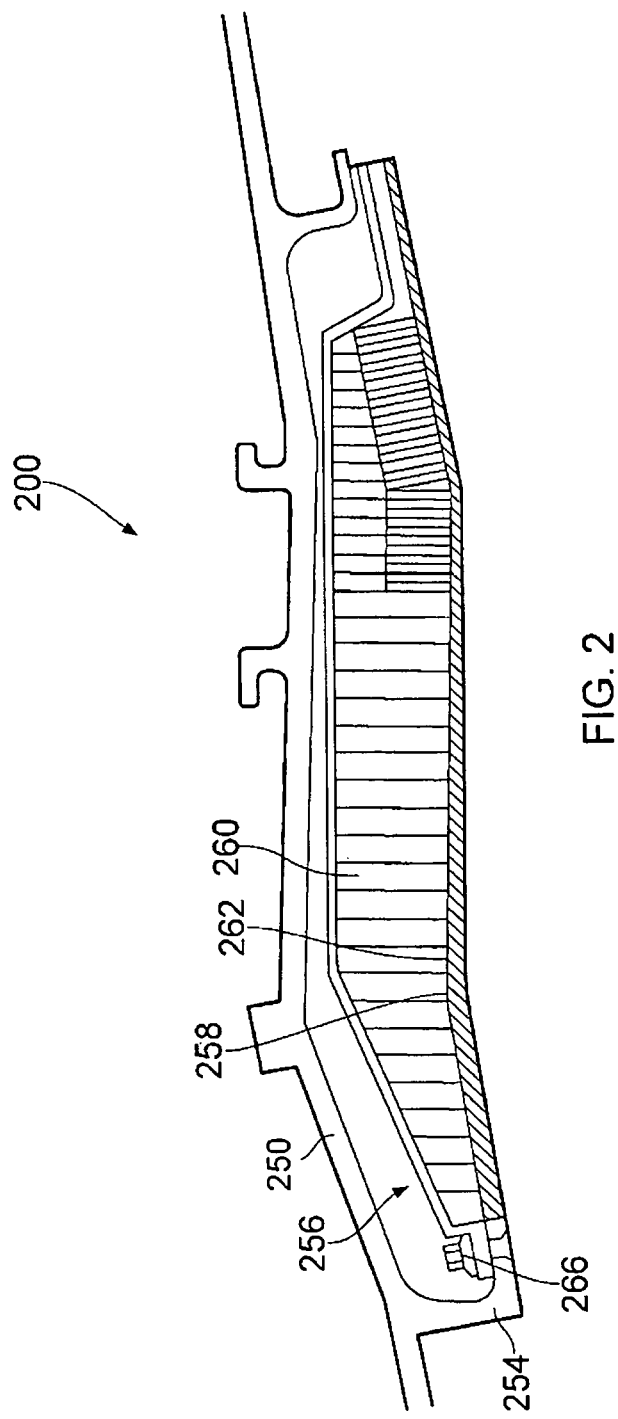
FIG. 2 illustrates a partial view of a cross-section through an alternative fan case arrangement of a gas turbine engine of the prior art.
Figure 3:
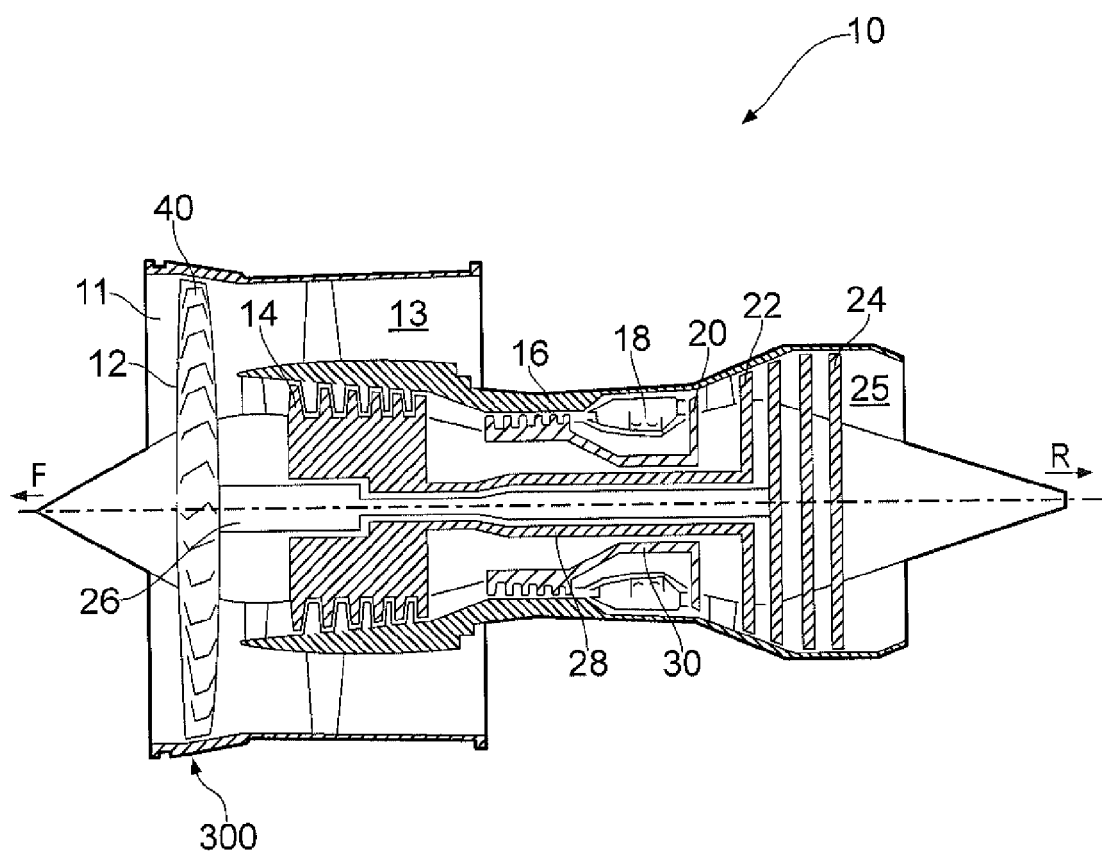
FIG. 3 illustrates a cross-section through the rotational axis of a high-bypass gas turbine engine.

With reference to FIG. 3 a bypass gas turbine engine is indicated at 10. The engine 10 comprises, in axial flow series, an air intake duct 11, fan 12, a bypass duct 13, an intermediate pressure compressor 14, a high pressure compressor 16, a combustor 18, a high pressure turbine 20, an intermediate pressure turbine 22, a low pressure turbine 24 and an exhaust nozzle 25. The fan 12, compressors 14, 16 and turbines 20, 22, 24 all rotate about the major axis of the gas turbine engine 10 and so define the axial direction of the gas turbine engine.

Air is drawn through the air intake duct 11 by the fan 12 where it is accelerated. A significant portion of the airflow is discharged through the bypass duct 13 generating a corresponding portion of the engine thrust. The remainder is drawn through the intermediate pressure compressor 14 into what is termed the core of the engine 10 where the air is compressed. A further stage of compression takes place in the high pressure compressor 16 before the air is mixed with fuel and burned in the combustor 18. The resulting hot working fluid is discharged through the high pressure turbine 20, the intermediate pressure turbine 22 and the low pressure turbine 24 in series where work is extracted from the working fluid. The work extracted drives the intake fan 12, the intermediate pressure compressor 14 and the high pressure compressor 16 via shafts 26, 28, 30. The working fluid, which has reduced in pressure and temperature, is then expelled through the exhaust nozzle 25 generating the remainder of the engine thrust.

The intake fan 12 comprises an array of radially extending fan blades 40 that are mounted to the shaft 26. The shaft 26 may be considered a hub at the position where the fan blades 40 are mounted. FIG. 3 shows that the fan 12 is surrounded by a fan containment system 300 that also forms one wall or a part of the bypass duct 13.

In the present application a forward direction (indicated by arrow F in FIG. 3) and a rearward direction (indicated by arrow R in FIG. 3) are defined in terms of axial airflow through the engine 10.

Figure 4:
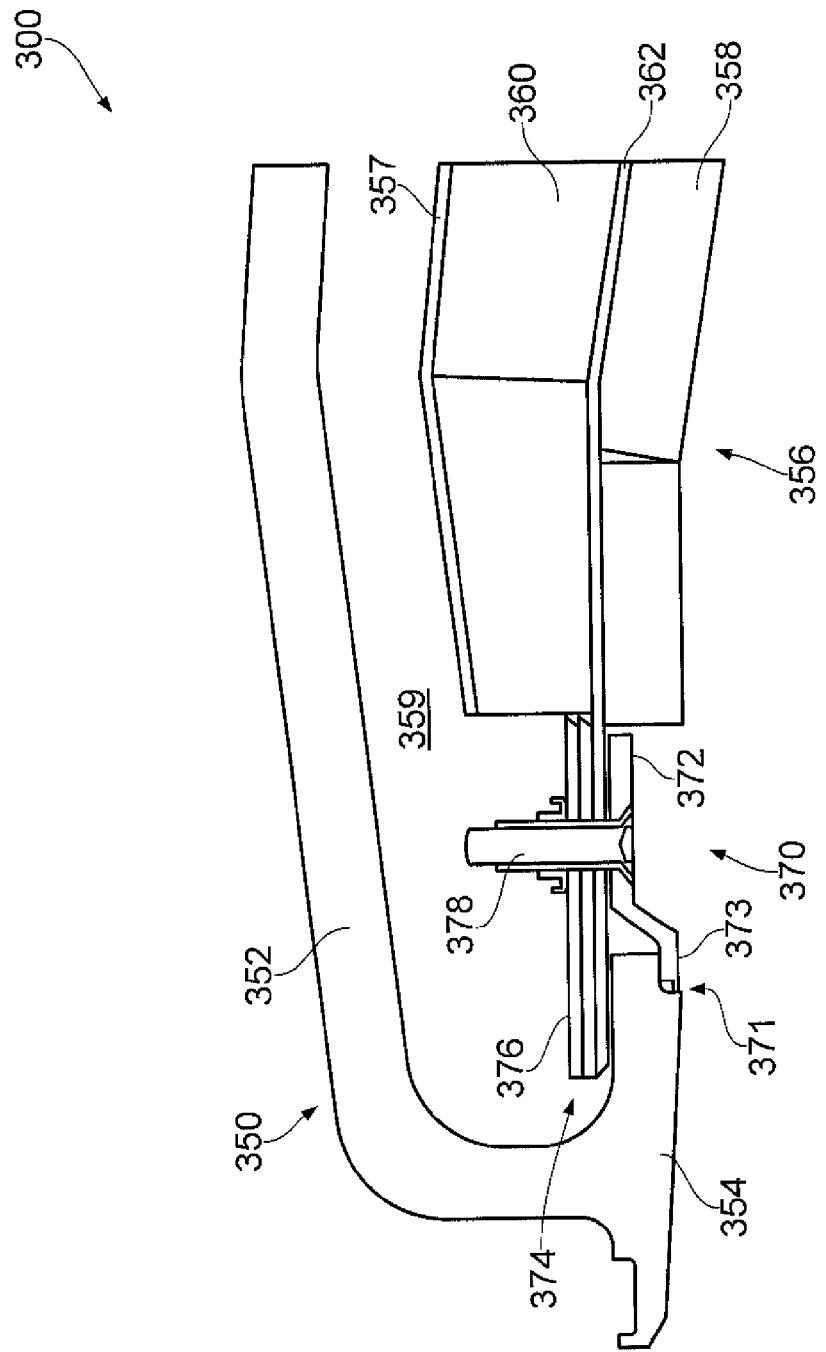
FIG. 4 illustrates a partial cross-section through a fan blade containment system.
Figure 5:
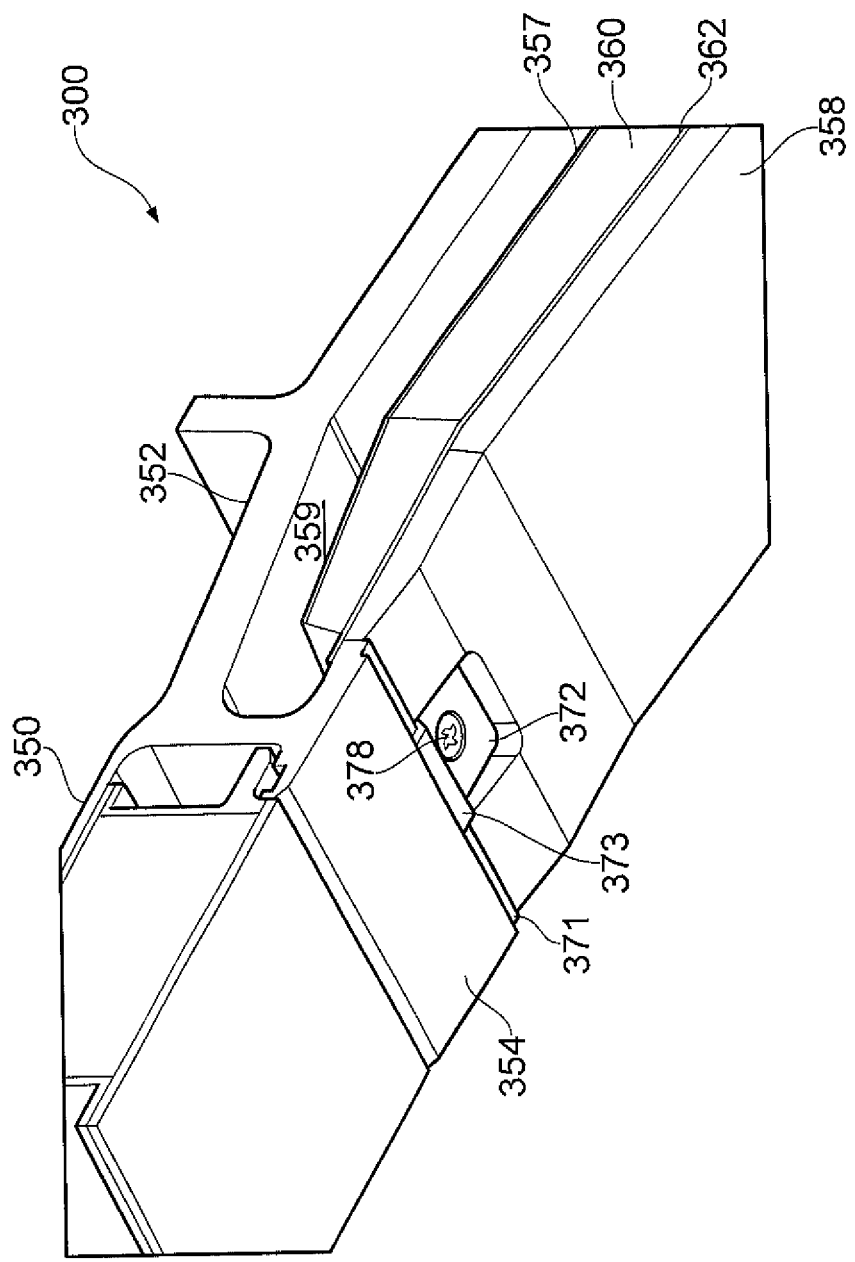
FIG. 5 illustrates a perspective view of a partial cross-section of the fan blade containment system of FIG. 4.
Figure 6:
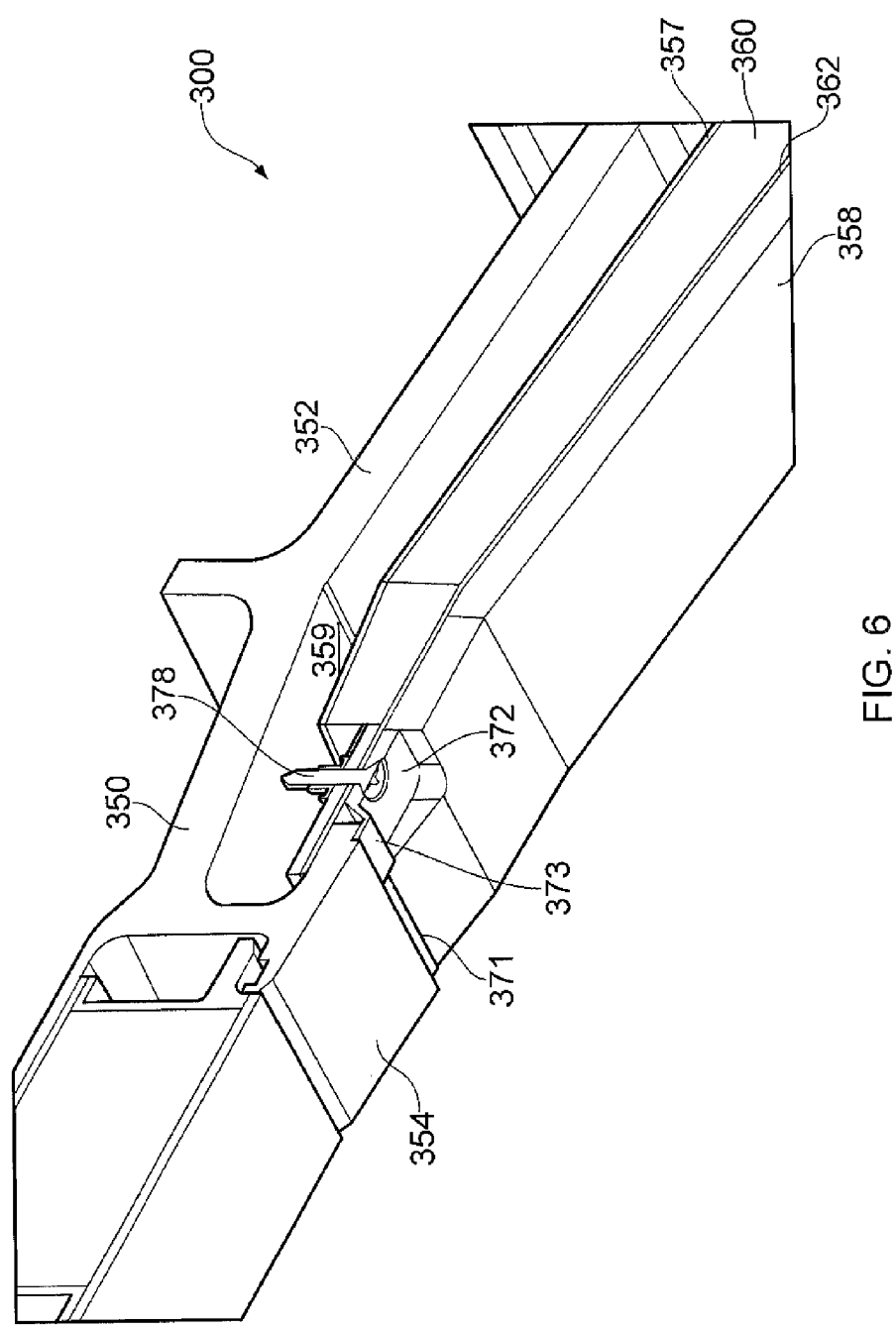
FIG. 6 illustrates a perspective view of a partial cross-section through a clamping arrangement of the fan blade containment system of FIG. 4.
Figure 7:
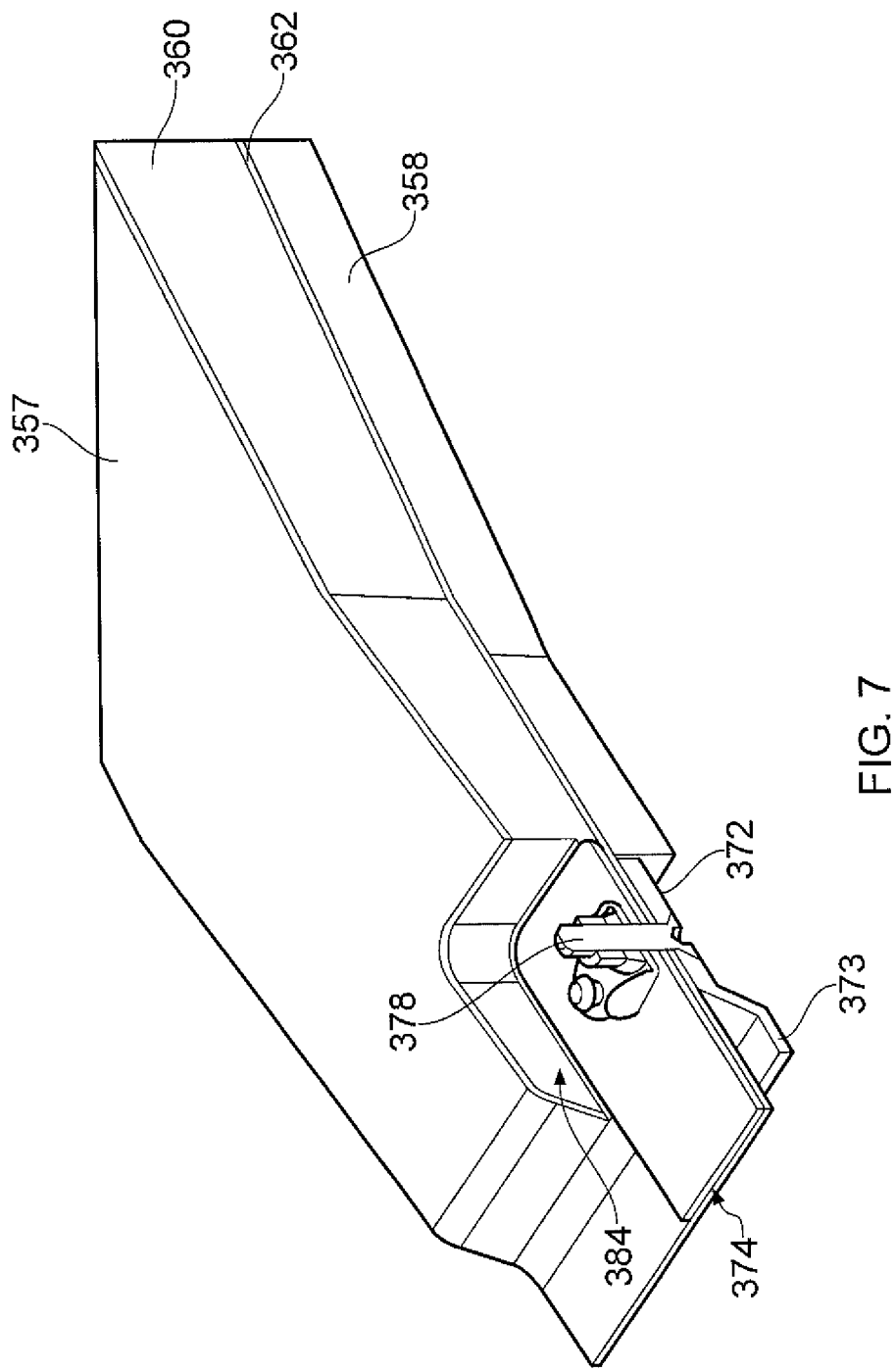
FIG. 7 illustrates a perspective view from a radially outer surface of a partial cross-section through a clamping arrangement of a fan track liner and clamping arrangement of the fan blade containment system of FIG. 4.

Referring now to FIGS. 4 to 6, the fan containment system 300 is shown in more detail. The fan containment system 300 comprises a fan case 350. The fan case 350 includes an annular casing element 352 that, in use, encircles the fan blades (not shown in FIGS. 4 to 6, but indicated at 40 in FIG. 3) of the gas turbine engine (indicated at 10 in FIG. 3). The fan case 350 further includes a hook 354 that projects from the annular casing element in a generally radially inward direction. The hook 354 is positioned, in use, axially forward of the fan blades and the hook is arranged so as to extend axially inwardly, such that in a fan blade off scenario the hook 354 prevents the fan blade from exiting the engine through the air intake duct (indicated at 11 in FIG. 3).

In the present embodiment, the hook 354 is substantially L-shaped and has a radial component extending radially inwards from the annular casing element 352 and an axial component extending axially rearward towards the fan blades from the radial component.

A fan track liner 356 is provided. The fan track liner 356 is annular and is positioned substantially coaxial to and radially inward of the annular casing element 352. A rearward end of the annular casing element is connected to the fan case 350 using methods known in the art. The fan track liner 356 includes a tray 357 to which an intermediate layer 360 is connected (e.g. bonded), in this embodiment the intermediate layer is a honeycomb layer. An attrition layer 358 is positioned, in use, proximal to the fan blades 40. A septum layer 362 provides an interface between the attrition layer and the intermediate layer, forming part of the bond between the two. The septum layer 362 also separates the attrition layer and the intermediate layer and distributes any applied load between the attrition layer and the intermediate layer.

The fan track liner 356 is spaced radially inward from the casing element 352 so that a voidal region 359 is formed between the fan track liner 356 and the casing element 352.

In the present embodiment, the fan track liner is formed of a plurality of adjacent arcuate panels arranged to be substantially coaxial. For example, in some installations it is envisaged that there might be provided a total of sixteen fan track liner panels in abutting relation around the fan case.

A forward end of the fan track liner 356 is connected to the hook 354 via a clamping arrangement 370. Various configurations of clamping arrangements will be described, but in general, the clamping arrangement includes a first clamping member 374 and second clamping member 372 (e.g. the clamping arrangement includes a clamp having a radially inner and radially outer jaw) that clamp against a radially inner and radially outer surface of the hook.

In the embodiment shown in FIGS. 3 to 8, the clamping arrangement 370 includes a plurality of first and second clamping members; one or more of each pair of first and second clamping members clamps each fan track liner panel to the hook 354.

The first clamping member 374 includes a plate 376 and a portion of the septum layer 362. The septum layer of the fan track liner extends from the fan track liner 356 to bridge a gap between the hook and the fan track liner, and rests on a radially outer surface of the hook. The plate 376 rests on the septum layer. As can be seen more clearly in FIGS. 7 and 8, a cut-away 384 is made in a radially outer surface (i.e. a non-gas washed surface) of the fan track liner to accommodate the plate 376. In the present embodiment the cut-away and the plate are substantially rectangular with rounded corners, but as will be appreciated by the person skilled in the art the plate and cut-away can have any suitable shape and the shape of the plate need not be the same as the shape of the cut-away. Provision of a cut-away can reduce or eliminate the protrusion of a fastener of the clamping arrangement (described later) from the nominal profile of the radially outer surface of the fan track liner so as to limit any impact of the fastener on the operation of the containment system in a fan blade off scenario.

In the present embodiment the plate 376 is bonded to the septum layer 362, e.g. using an adhesive such as epoxy resin. Adhesive is also used to fill a portion of the exposed honeycomb structure of the intermediate layer 360 for improved sealing and strength.

In the embodiment of FIGS. 3 to 8, the second clamping member 372 takes the form of a plate, more specifically a bent (or angled) plate (the plate may be formed by bending or by an alternative manufacturing method such as extrusion or moulding). The plate is bent so as to be positioned more radially outward at a position adjacent the fan track liner than a position adjacent the hook. The plate is further bent to form a lip 373 that rests on a radially inner surface of the hook, in the present embodiment a gas washed surface of the hook.

In the present embodiment, the hook 354 includes an undercut 371 that accommodates the lip 373 of the second clamping member 372.

The plate of the first clamping member and/or the second clamping member can be made from any suitable material, including a composite material or a metal material.

The first clamping member 374 and the second clamping member 372 are connected together using a fastener 378. The fastener can be tightened to adjust the compressive force applied to the hook 354 by the clamping arrangement 370. The fastener 378 is axially spaced from the hook 354 to be positioned between the hook 354 and the fan track liner 356, in this way no holes or other formations are required in the hook to accommodate the fastener 378.

Figure 8:
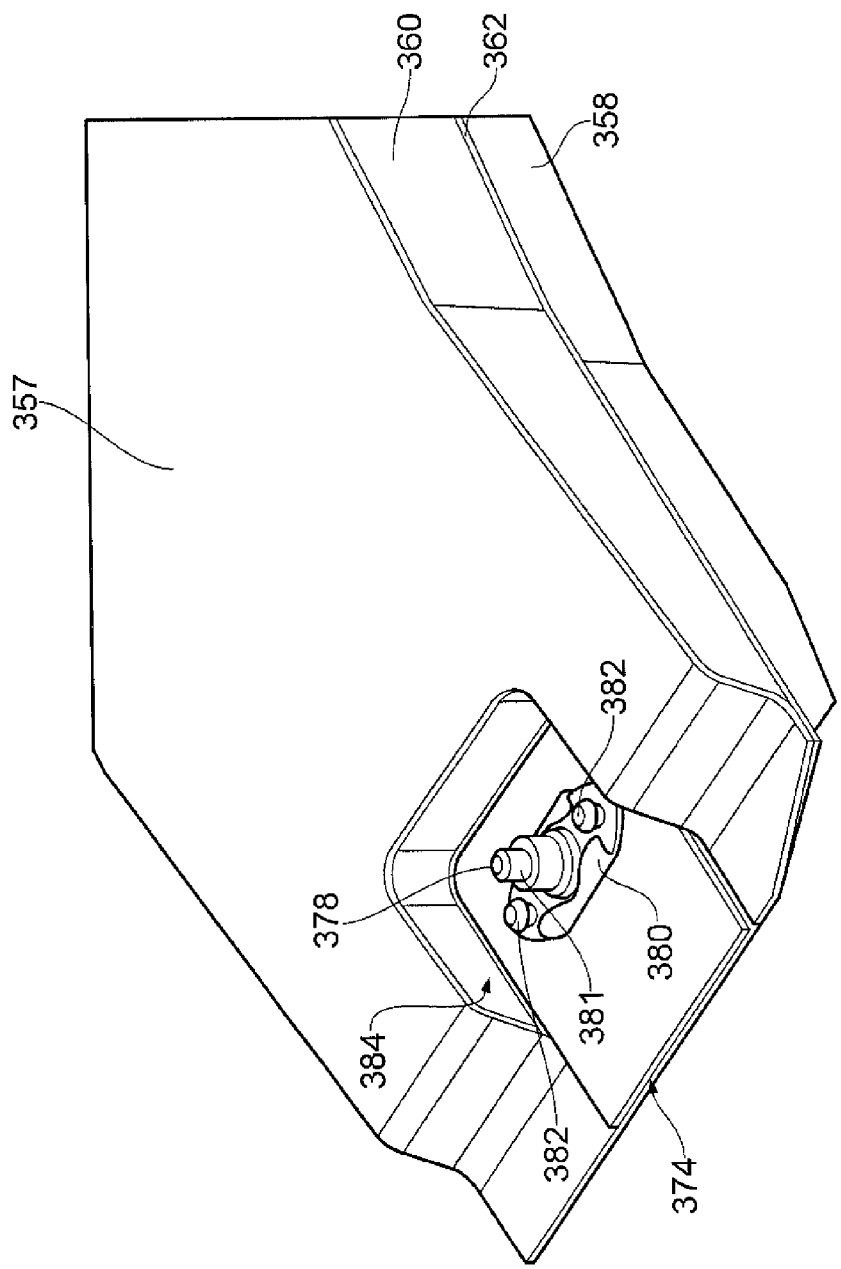
FIG. 8 illustrates a perspective view from a radially outer surface of a fan track liner and clamping arrangement of the fan blade containment system of FIG. 4.

Referring to FIG. 8, the fastener 378 of the present invention includes a bolt 381 and a nut 380. The nut 380 includes a plate member that abuts the plate 376 of the first clamping member 374. A further two rivets 382 connect the nut 380 to first clamp member 374 to limit rotation of the nut, this type of nut is often referred to as a basket nut. However, as will be appreciated by the person skilled in the art, the fastener may take many different forms, e.g. any type of bolt or screw may be used with any type of nut and optionally any type of known washer (for example a bolt and lock nut may be used). Alternatively or additionally an adhesive may be used instead of a fastener (e.g. the first and second clamping members may be bonded together). Further alternatively a clamp may be used instead of a fastener.

A filler material, e.g. the same material as used for the attrition layer 358 can optionally be provided on a gas washed surface of the second clamping member 372 and fastener 378. The filler may extend to provide a substantially smooth gas washed surface from the hook 354 to the fan track liner 356. Preferably, any steps in the profile of the gas washed surface of the fan containment system will be radially outward in the direction of flow through the gas turbine engine 10.

As mentioned previously, the clamping arrangement 370 includes a plurality of plates 376 of the first clamping member 374, a plurality of plates of the second clamping member 372, and a plurality of fasteners 378 spaced circumferentially around the fan track liner 356 and hook 354. The spacing of the plates and fasteners, the dimensions of the plates, and the amount of overlap of the plates with the hook can be selected to optimise fuse load to operate the trapdoor and to optimise trapdoor vibration frequencies. In an exemplary embodiment, the number of clamping plates provided may be selected to suit the number of arcuate fan track liner panels provided around the fan case. For example, in the case of there being sixteen fan track liner panels, there may be provided four clamping plates of equal length, each extending across a respective set of four fan track liner panels. In order to facilitate easy maintenance of the fan track liner panels, the ends of each clamping plate may coincide with the edge of a fan track liner panel.

During normal operation of the gas turbine engine 10, the clamping arrangement 370 fixes the position of the fan track liner with respect to the hook in both a radially inward and a radially outward direction. In this way, the fan track liner can resist ice impact and maintain aerodynamic efficiency.

In the event of a fan blade 40 (or part of a fan blade as the case may be) being released from the hub, the fan blade travels rapidly outwards and forwards in an axial direction. As the fan blade travels outwards it impacts the fan track liner 356. Impact of the fan blade with the fan track liner causes the second clamping member 372 to fail; that is the lip of the second clamping member either bends to move away from the hook, or shears or fractures so as to no longer be in contact with the hook. The failure of the second clamping member means that the fan track liner 356 is free to move into the voidal region 359 under the force applied by the released fan blade. The fan blade then has a substantially unimpeded path to the hook 354. The fan blade 40 impacts the hook and is held by the hook 354 and further axially forward movement is prevented. A trailing blade then forces the held released blade rearwards where the released blade is contained.

The use of the clamping arrangement instead of fasteners of the prior art mitigates the risk of the integrity of the hook being damaged when the fan blade impacts the fan track liner, so that the likelihood of containment of a released fan blade is improved. This is because unlike conventional methods of connecting the fan track liner to the hook, the present embodiment does not require holes to be formed in the hook to receive a fastener. Tests carried out on the presently described embodiment have found that the clamping arrangement does not interfere with the movement of the fan track liner towards the annular casing element in a fan blade off scenario. The tests further demonstrated that vibration integrity is maintained during normal operation of the engine 10.

Figure 9:
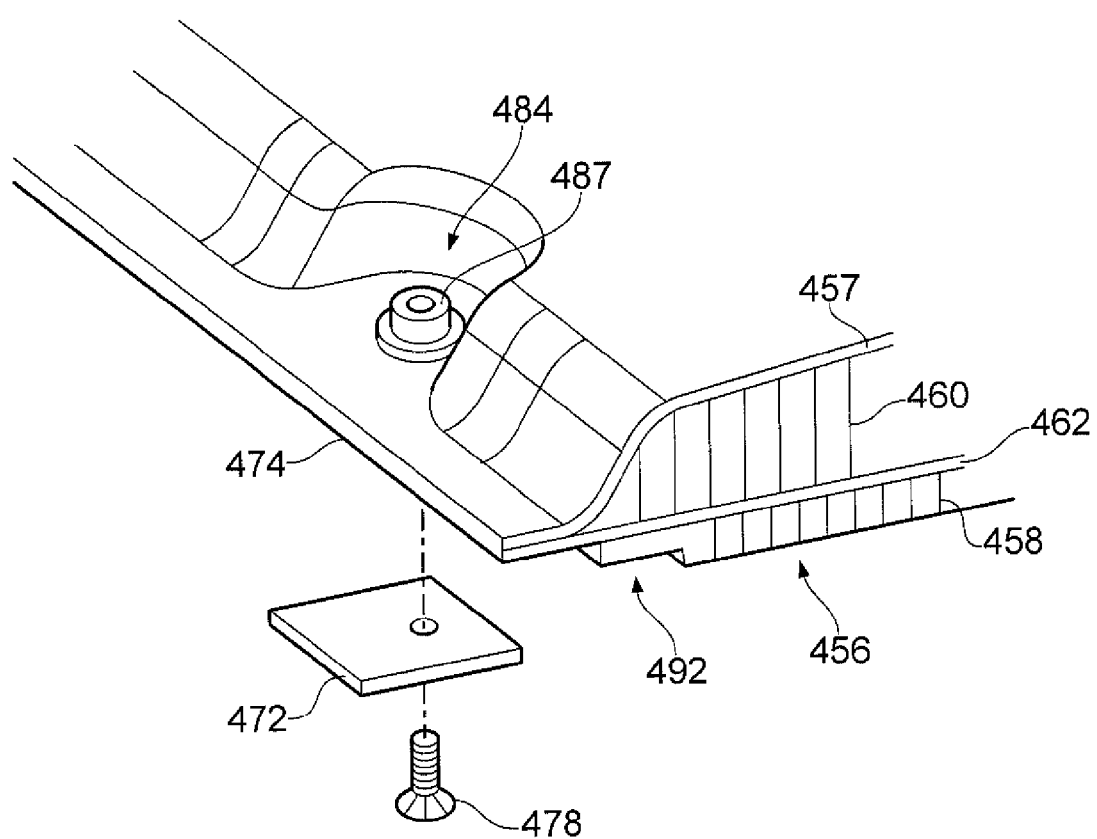
FIG. 9 illustrates a perspective view from a radially outer surface of a fan track liner and clamping arrangement of an alternative fan containment system.

A fan track liner 456 and clamping arrangement of an alternative embodiment is illustrated in FIG. 9. In the embodiment of FIG. 9 features are labelled with similar reference numerals as the previously described embodiment but with a prefix "4" instead of "3". Only the main differences will be described here.

Instead of using a cut-away to form the recess, as described in the previous embodiment, the fan track liner 456 of FIG. 9 includes depressions 484 to form a recess in the fan track liner. Each depression 484 is dimensioned so as to accommodate a fastener 478 that connects the first and second clamping members 474, 472. The depressions are spaced circumferentially around the fan track liner 456.

In the embodiment of FIG. 9, the first clamping member 474 includes the septum layer 462 and the tray 457; the tray 457 providing a similar functionality as the plate 376 of the previously described embodiment.

The second clamping member 472 is a flat plate. One end of the plate sits in a recess 492 formed in the attrition layer 458 of the fan track liner, and the other end of the plate rests against a relieved portion (i.e. the undercut) of the gas washed surface of the hook (not shown in FIG. 9).

In the event of a fan blade off event, the second clamping member 472 will fail, in a similar manner to that previously described, so as to encourage containment of a released fan blade.

Figure 10C:
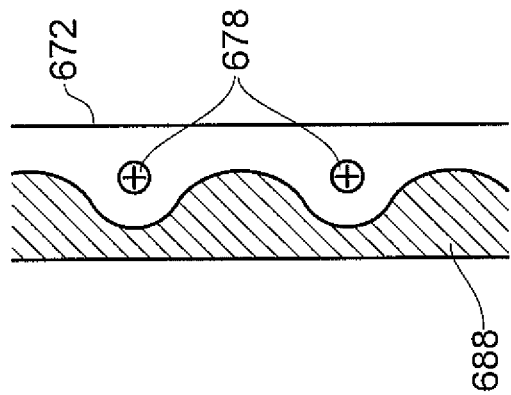
FIGS. 10B and 10C illustrate a partial plan view of a second clamping member of a clamping arrangement of alternative fan containment systems.
Figure 10B:
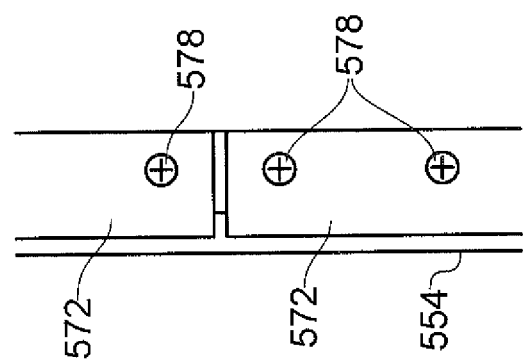
Figure 10A:
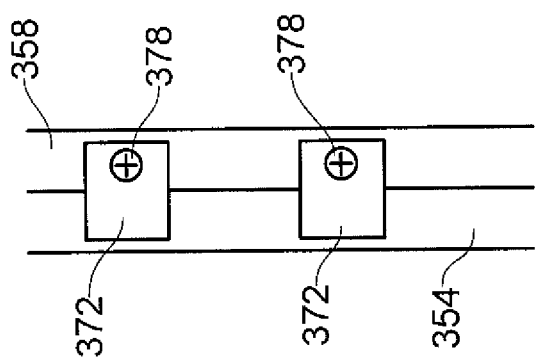
FIG. 10A illustrates a partial plan view of a second clamping member of the clamping arrangement of the fan containment system of FIG. 4.

In the embodiments previously described, the second clamping member is provided by a series of circumferentially spaced plates, as illustrated in FIG. 10A. However, in alternative embodiments, the second clamping member may form a substantially annular member, for example as shown in FIG. 10B a second clamping member 572 may be provided as a single or as two (or more) arcuate plates that connect together to form a substantially annular ring. The substantially annular clamping member may have a constant profile in an axial direction, but alternatively the clamping member may have a curved profile, e.g. may have a waved profile in the axial direction. An example of a second clamping member 672 having a waved profile is shown in FIG. 10C. The waved profile is such that the axial width of the clamping member 672 is greater at the position of each of the fasteners 678 that connect to the first clamping member (not shown). Filler material 688 can be provided in a region defined by a rearward face of the hook (e.g. a forward face of a recess formed between the hook and the annular clamping member) and a forward face of the annular clamping member 672.

Figure 11:
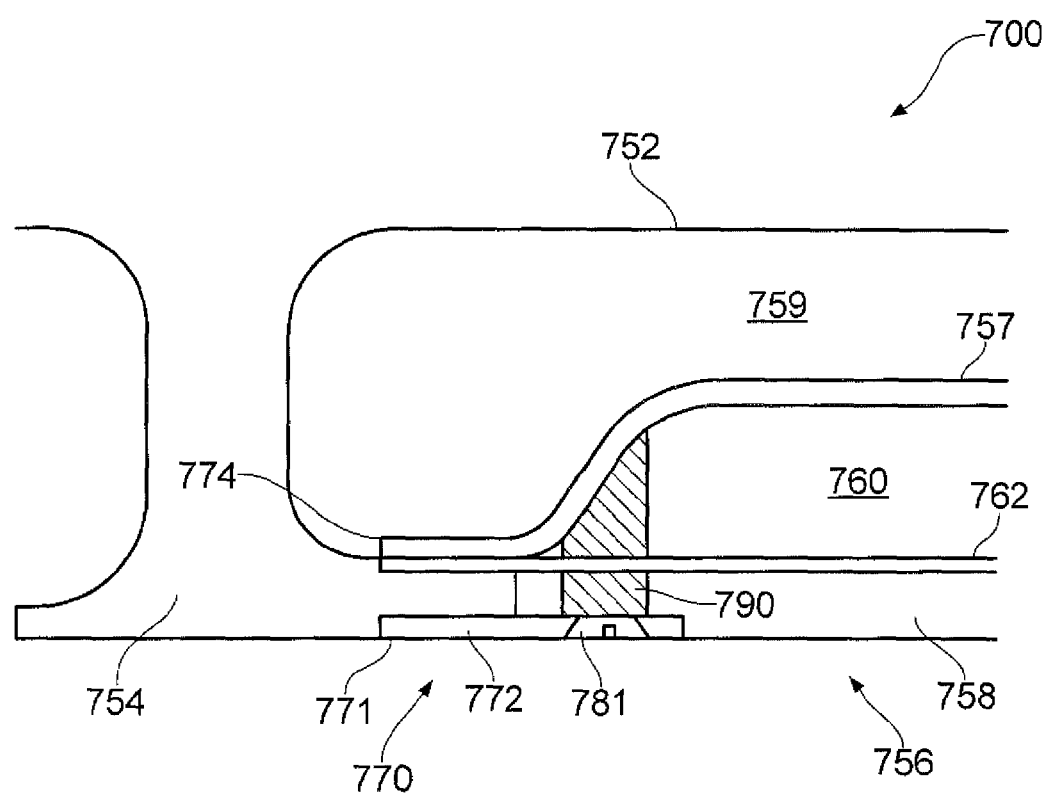
FIGS. 11 to 13 illustrate a partial cross section of further alternative fan containment systems.

A further alternative fan containment system is indicated generally at 700 in FIG. 11. Similar reference numerals as used for the previously described embodiment of FIGS. 4 to 8 are used for the embodiment of FIG. 11, but with a prefix "7" instead of "3". Only the differences will be described here.

The clamping arrangement 770 of the containment system 700 includes a first clamping member 774 and a second clamping member 772, similar to as previously described. However, fan track liner 756 includes a threaded insert 790. The insert 790 is bonded in to the attrition liner 758 and the intermediate layer 760 through the septum layer 762. The second clamping member 772 is attached to this insert with a screw 781 (but in alternative embodiments an alternative type of fastener may be used). If a released fan blade impacts the fan track liner, the second clamping member 772 fails to permit movement of the fan track liner 756 towards the fan case 752, similar to that described previously.

The first clamping member 774 is defined by a portion of the tray 757 and the septum layer 762 of the fan track liner.

Figure 12:
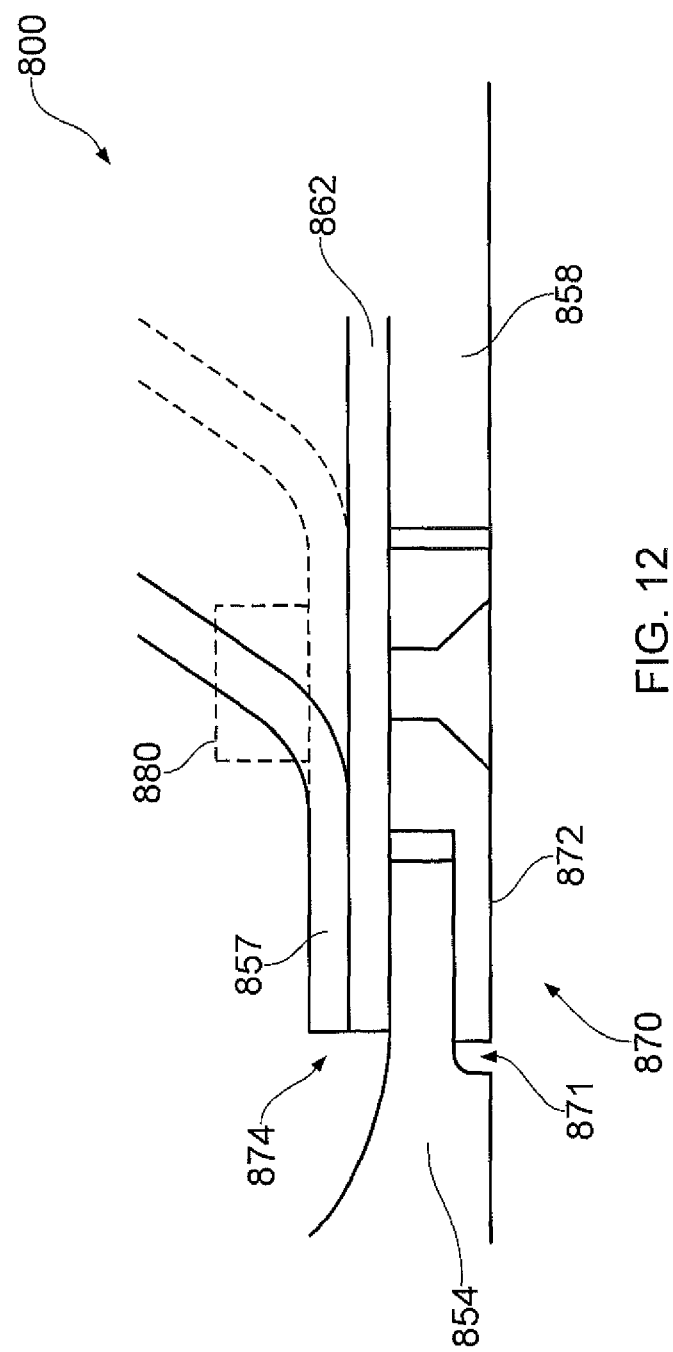

A yet further alternative fan containment system is indicated generally at 800 in FIG. 12. Similar reference numerals as used for the previously described embodiment of FIG. 11 are used for the embodiment of FIG. 12, but with a prefix "8" instead of "7". Only the differences will be described here.

The main difference between the embodiment of FIG. 12 and the embodiment of FIG. 9 is the shape of the second clamping member. In the embodiment of FIG. 12, the second clamping member 872 includes a plate section and a radial section, and the radial section has a radial thickness substantially equal to the thickness of the attrition layer 858, e.g. the radial section extends from a plate section to the septum layer 862. A radially outer surface of the second clamping member abuts against the septum layer 862.

The tray 857 of the fan track liner 856 may be formed to include depressions (indicated by the dotted profile) or the fan track liner 856 may not include any depressions (as indicated by the solid line). When the tray does not include any depressions, the second clamping member may be connected to the tray using a fastener 880, e.g. nut and bolt, or alternatively the second clamping member may be connected to the tray via the septum layer, e.g. by bonding.

Figure 13:
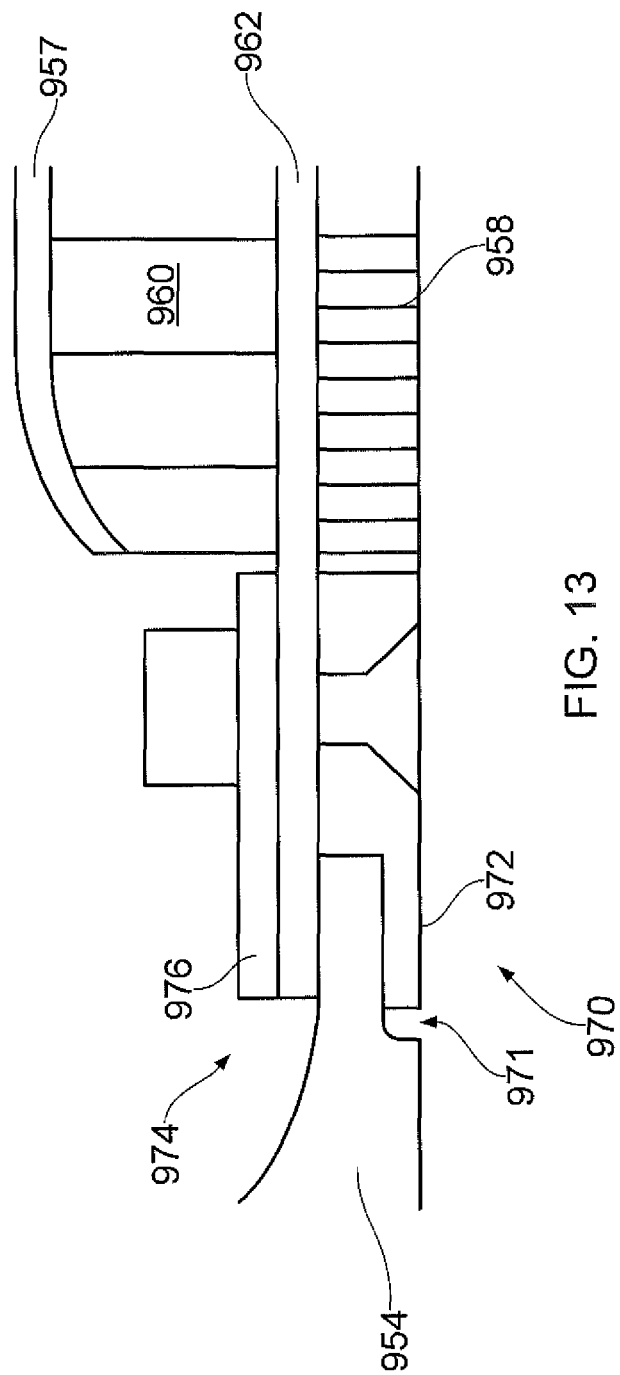
Figure 14:
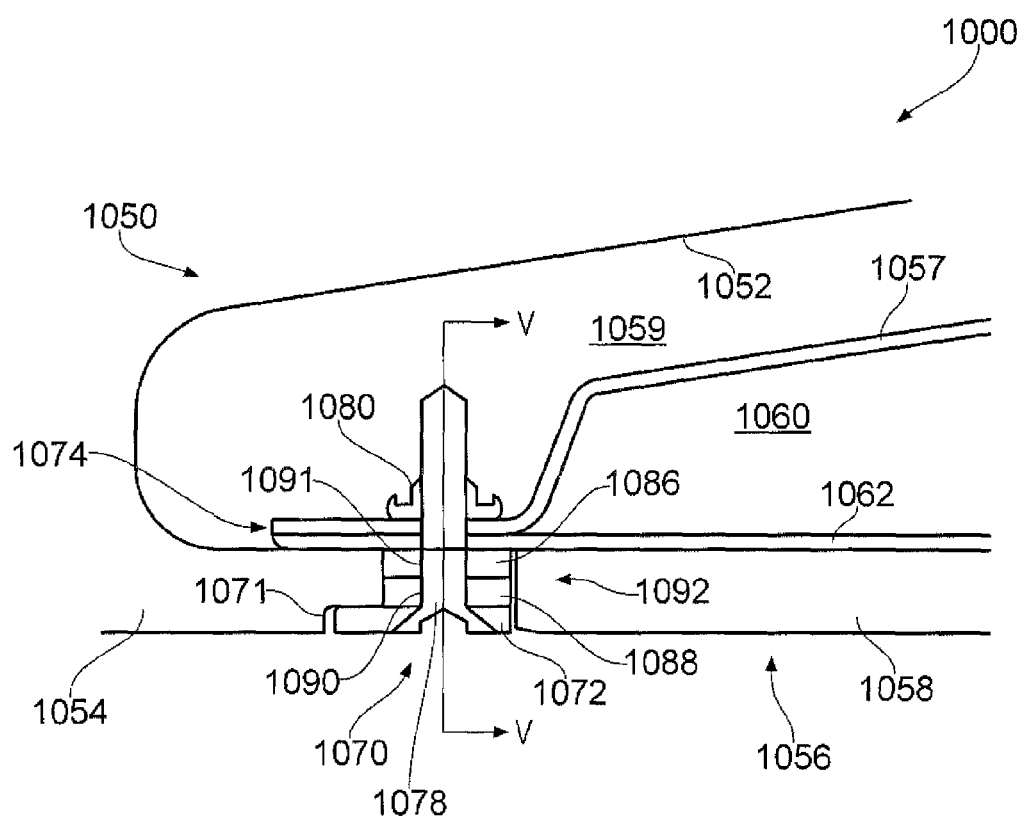
FIG. 14 illustrates a partial cross-section through a yet further alternative fan containment system.

A still further alternative fan track liner and clamping arrangement is shown in FIG. 13. Similar reference numerals as used for the previously described embodiment of FIGS. 4 to 8 are used for the embodiment of FIG. 13, but with a prefix "9" instead of "3". Only the differences will be described here.

In the embodiment of FIG. 13, the first clamping member 974 is defined by a portion of the septum layer 962 and a plate 976, similar to the embodiment of FIG. 4. The second clamping member 972 is substantially L-shaped and includes a support (or radial) portion and a plate portion, the support portion having a greater radial thickness than the plate portion. The fan track liner 956 is connected to the hook by virtue of the septum layer 962 only, the septum layer extending to overlap the hook 954 and form part of the first clamping member 974. The tray 957 does not extend to the hook 954, and instead terminates before the hook 954. As such, no recesses (e.g. depressions or cut-outs) are formed in the tray 957 for accommodating a fastener.

In the event of a fan blade off scenario, the fan containment system of FIG. 13 functions differently to the previously described embodiments. In the embodiment of FIG. 13, when a fan blade impacts the fan track liner 956, the septum layer that spans the gap between the first and second clamping members and the fan track liner fails in preference to failure of the second clamping member 972. The released fan blade then impacts the hook and is contained in a similar manner to that described for the previous embodiments.

Referring now to FIGS. 14 to 17, a further alternative fan containment system is illustrated. Similar features are given a similar reference numeral as the previously described embodiments but with a prefix "10".

Figure 15:
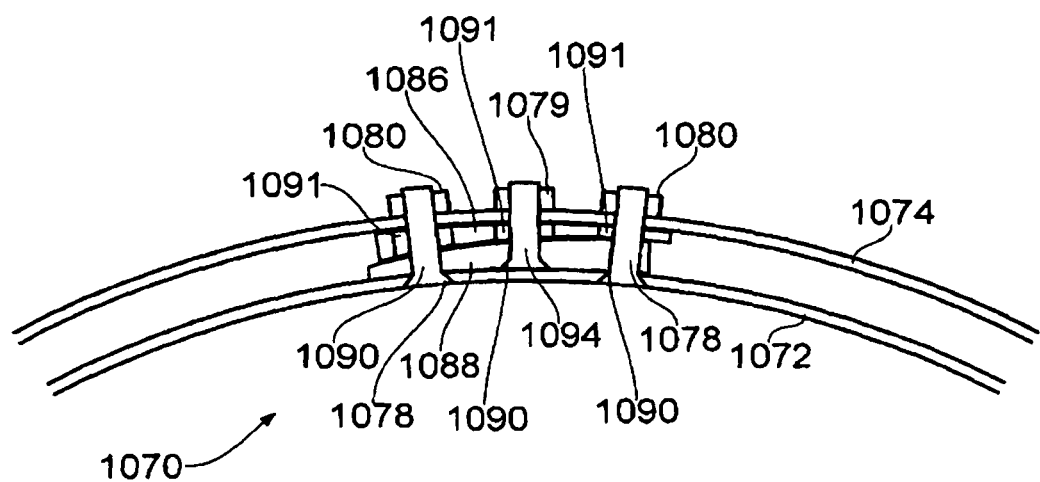
FIG. 15 illustrates a partial transverse cross-section through the containment system illustrated in FIG. 14, taken along line V-V in FIG. 14.
Figure 16:
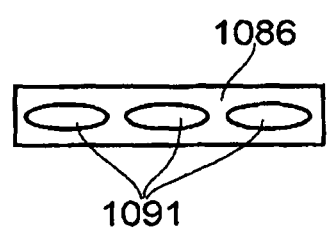
FIG. 16 shows part of the fan containment system of FIG. 14 in more detail.

The fan containment system 1000 of FIGS. 14 to 17 includes a pair of cooperating pads or shims 1086, 1088 provided between the first clamping member 1074 and the second clamping member 1072, and axially adjacent the hook 1054. As shown most clearly in FIG. 15, the shims 1086, 1088 are generally arcuate and are circumferentially wedge-shaped. As will thus be noted, the shims 1086, 1088 are thus each circumferentially tapered in the sense that their radial thickness varies along their circumferential extent. As will be described in more detail below, the shims 1086, 1088 are provided in cooperating pairs, as illustrated in FIG. 15, at spaced-apart clamping positions around the fan case 1050.

The radially outermost shim 1086 of each pair has an arcuate outer surface which is configured to bear against the radially innermost surface of the first clamping member 1074. Similarly, the radially innermost shim 1088 of each pair has an arcuate inner surface which is configured to bear against the radially outermost surface of the second clamping member 1072. Both shims 1086, 1088 present a respective arcuate contact surface for contact with one another. As will be noted, the shims 1086, 1088 are arranged in circumferentially overlapped relation to one another such that the radially thickest end of the outer shim 1086 is generally aligned with the radially thinnest end of the inner shim 1088 and vice-versa. The cooperating contact surfaces of the two shims may be roughened so as to have a relatively high coefficient of friction.

Each shim 1086, 1088 is provided with a series of three through-holes 1090, 1091 in spaced relation to one another along the circumferential length of the shim, and which extend through the radial thickness of the shim. The holes provided through each shim are arranged for general alignment with the holes provided through the other shim.

However, the holes are not identical for each shim. In the case of the radially innermost shim 1088, the holes 1090 are generally circular, whilst in the case of the radially outermost shim 1086 the holes 1091 are somewhat elongate in the circumferential direction, as illustrated most clearly in FIG. 16 which shows an arrangement in which the holes 1091 extending through the radially outermost shim 1086 are generally oval.

The shims 1086, 1088 are provided in cooperating pairs around the fan case, at respective clamping positions, and are settable relative to one another to ensure that a predetermined clamping load is applied between the first and second clamping members 1074, 1072 when each clamping arrangement 1070 is configured and clamped around the hook 1054. As will be appreciated, the shims 1086, 1088 of each pair thus cooperate to define a radial spacer 1092 between the clamping members 1074, 1072 as will be described in more detail below.

In order to configure the clamping arrangement 1070, the two shims 1086, 1088 are provided in overlapping relation as illustrated in FIG. 15, such that their respective contact surfaces are in contact with one another. It is envisaged that the actual degree of circumferential overlap between the two shims 1086, 1088 will be carefully adjusted, via circumferential movement of the two shims relative to one another, to set the radial thickness of the radial spacer 1092, which the two shims 1086, 1088 define such that it is slightly less than the local radial thickness of the adjacent region of the hook 1054, by a predetermined offset distance.

As will be appreciated, the elongate and oval configuration of the holes 1091 extending through the outermost shim 1086 allows those holes to remain aligned and in communication with the circular holes 1090 through the innermost shim 1088 throughout an appropriate range of relative adjustment between the two shims. Once the two shims 1086, 1088 of each pair have been properly adjusted relative to one another in this way, their relative positions are then set by the insertion of a fastener, in the form of a setting bolt or screw 1094, through the aligned centre holes 1090, 1091 of the two shims 1086, 1088. The setting bolt 1094 may be threadingly engaged with a setting nut 1079 which is located against the radially outermost side of the first clamping member 1074. As illustrated in FIG. 15, the central hole 1090 in the radially innermost shim 1088 may be countersunk to accommodate the head of the setting screw 1094.

As will be appreciated, the roughened contact surfaces between the two shims supplement the function of the setting screw 1094 in preventing relative movement between the shims once they have been set to their required positions relative to one another. Additionally, or even instead of the fixing screw, the shims may be bonded to one another once their relative positions have been set, for example via the use of a suitable adhesive such as epoxy resin.

When the shims 1086, 1088 have been set relative to one another as described above, the second clamping member 1072 can be offered up to the arrangement and clamped against the radially inner surface of the hook 1054 by the insertion and tightening of a pair of fasteners in the form of clamping screws or bolts 1078 which are inserted radially outwardly through respective apertures 1096 formed in the second clamping member 1072; through the aligned end holes 1090, 1091 in the shims and through corresponding apertures formed in the first clamping member. The clamping screws 1078 are threadingly engaged with respective clamping nuts 1080 which are located against the radially outermost side of the first clamping member 1074, on opposite sides to the setting nut 1079. As will be noted from FIG. 4, the clamping screws 1078 are spaced axially from the hook 1054, and do not pass through the hook.

Figure 17:
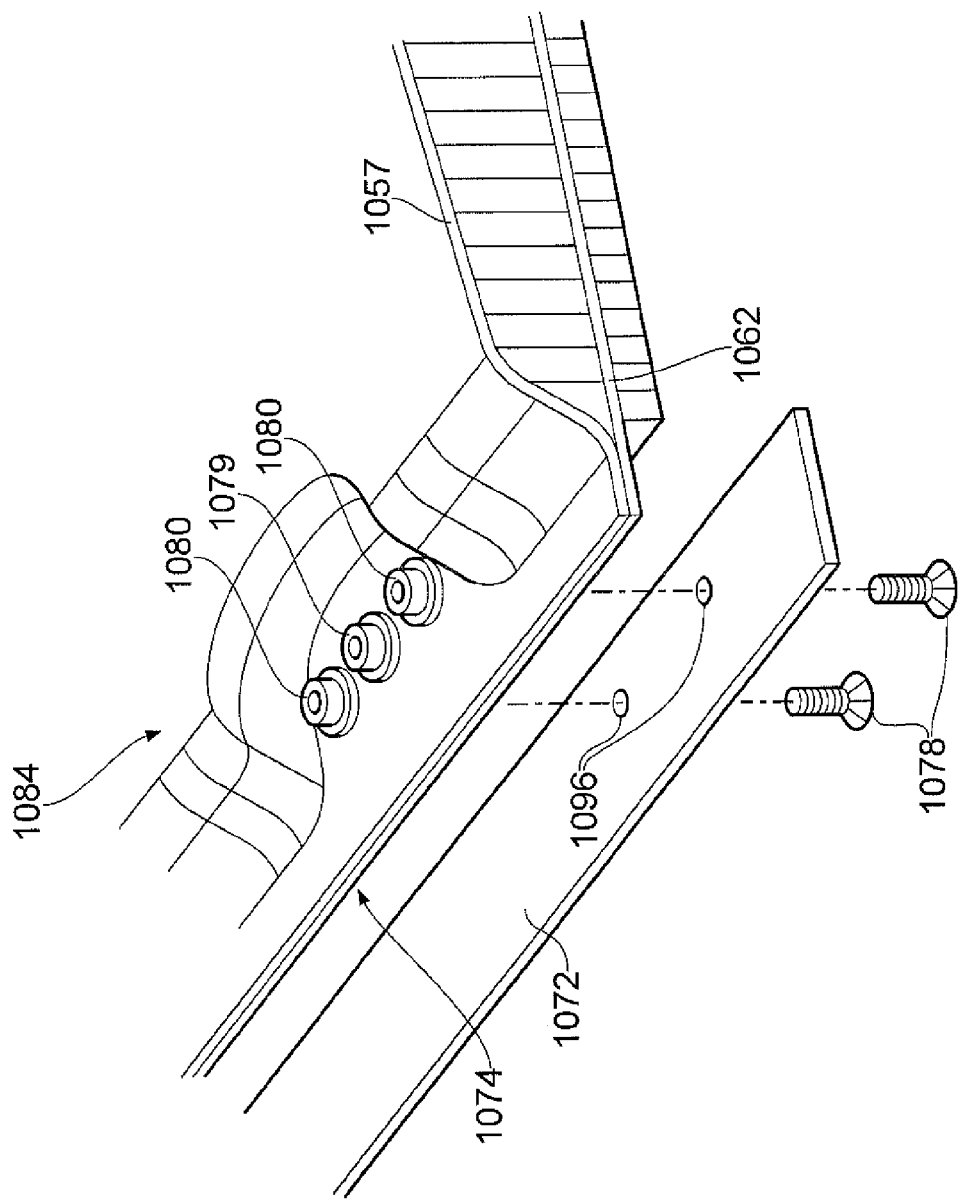
FIG. 17 illustrates a perspective view from a radially outer surface of a fan track liner and clamping arrangement of the fan containment system of FIG. 14.

As illustrated in FIG. 17, the radially outward side of the fan track liner 1056 includes a depression 1084 at each clamping position, to form a recess in the fan track liner 1056. Each depression 1084 is sized to accommodate the nuts 1079, 1080 of the clamping arrangement. The provision of a depression 1084 at each clamping position in this manner avoids the protrusion of the nuts 1079, 1080 from the nominal profile of the radially outer surface of the fan track liner so as to limit any impact of the nuts on operation of the containment system in a fan blade off event.

It should appreciated at this juncture that the three nuts 1079, 1080 could be replaced with a single nut member taking the form of a plate which is riveted to the outer surface of the first clamping member 1074 and which defines respective threaded holes or sockets to receive the setting screw 1094 and the clamping screws 1078.

As the clamping screws 1078 are tightened, the first and second clamping members 1074, 1072 are drawn towards one another to clamp around the hook 1054. As indicated above, the shims 1086, 1088 are set relative to one another such that the radial spacer 1092 which they define between the two clamping members is thinner than the radial thickness of the local adjacent region of the hook 1054, by a predetermined offset. This offset is carefully selected so that when the clamping members 1074, 1072 are clamped around the hook 1054 as described, a predetermined clamping load is applied to the hook 1054. Additionally, as illustrated most clearly in FIG. 4, the offset may be selected to ensure that the radially innermost surface of the second clamping member 1072 is substantially aerodynamically flush with the radially innermost surface of the hook 1054 and/or the radially innermost surface of the fan track liner 1056.

As indicated above, it is intended to provide clamping arrangements 1070 of the type described above at circumferentially spaced apart positions around the fan case 1050. Each clamping arrangement 1070 may comprise a single pair of shims 1086, 1088 of the type described above, or may alternatively comprise two pairs of shims provided adjacent one another.

It is intended that the shims 1086, 1088 of each pair and/or each clamping arrangement will be set relative to one another as described, independently of each other pair and in dependence on the local radial thickness of the hook 1054. In this manner, the shims can be adjusted to account for circumferential variations in the radial thickness of the hook 1054, and thus the shims of each pair may be set to define a slightly different radial thickness than other pairs. Nevertheless, it is intended that the shims 1086, 1088 of each pair will be identical to the shims of each other pair. Because of their circumferentially tapered configuration, the shims of each pair can be identical whilst still accommodating sufficient local adjustment of their radial thickness, without needing to provide a large number of differently sized shims.

During normal operation of the gas turbine engine 10, the clamping arrangement 1070 fixes the position of the fan track liner 1056 with respect to the hook 1054 in both a radially inward and a radially outward direction. In this way, the fan track liner can resist ice impact and maintain aerodynamic efficiency.

By providing the pairs of wedge-shaped shims between the two clamping members, account can be taken of circumferential variations in the thickness of the hook, thereby ensuring substantially equal clamping force is applied to the hook at all clamping positions.

It will be appreciated by one skilled in the art that, where technical features have been described in association with one embodiment, this does not preclude the combination or replacement with features from other embodiments where this is appropriate. Furthermore, equivalent modifications and variations will be apparent to those skilled in the art from this disclosure. Accordingly, the exemplary embodiments of the invention set forth above are considered to be illustrative and not limiting.

The invention claimed is:

1. A fan containment system for fitment around an array of radially extending fan blades mounted on a hub in an axial gas turbine engine, the fan containment system comprising:
   a fan case having an annular casing element for encircling the array of fan blades and a hook projecting in a generally radially inward direction from the annular casing element and positioned axially forward of the array of fan blades when the fan containment system is fitted around the array of fan blades;
   an annular fan track liner positioned substantially coaxial to the annular casing element; and
   a clamping arrangement connecting the fan track liner to the hook,
   wherein the clamping arrangement comprises a first clamping member positioned radially outward of the hook and a second clamping member positioned radially inward of the hook, the hook being clamped between the first clamping member and the second clamping member,
   wherein the first clamping member is connected to the second clamping member via one or more fasteners that are axially spaced rearwardly from all portions of the hook, and
   wherein the clamping arrangement is configured such that under the condition that a released fan blade impacts the fan track liner, the clamping arrangement substantially releases the connection between the hook and a portion of the fan track liner so that at least a portion of the fan track liner can move towards the annular casing element so as to encourage the released fan blade to impact the hook.

2. The fan containment system according to claim 1, wherein at least a portion of a component of the clamping arrangement is configured to fail when the released fan blade impacts the fan track liner.

3. The fan containment system according to claim 2, wherein the second clamping member is configured to fail when the released fan blade impacts the fan track liner.

4. The fan containment system according to claim 1, further comprising a connector connecting the first clamping member and the second clamping member to the fan track liner, and wherein the connector is configured to fail when the released fan blade impacts the fan track liner.

5. The fan containment system according to claim 1, wherein the hook comprises an undercut that accommodates at least a portion of the second clamping member.

6. The fan containment system according to claim 1, wherein the one or more fasteners extends through at least a portion of the fan track liner.

7. The fan containment system according to claim 1, wherein the first clamping member comprises at least a portion of a component of the fan track liner.

8. The fan containment system according to claim 1, wherein the fan track liner comprises a tray proximal to the annular casing element, an intermediate layer connected to the tray, an attrition layer proximal, in use, to the fan blades, and a septum layer substantially radially between the intermediate layer and the attrition layer, and wherein the first clamping member comprises a portion of the septum layer and/or the tray.

9. The containment system according to claim 1, wherein the first clamping member and/or the second clamping member comprise a series of discrete circumferentially spaced plates.

10. The containment system according to claim 1, wherein the clamping arrangement further comprises at least one pair of cooperating wedge-shaped shims positioned between the clamping members and axially adjacent the hook, the shims being arranged relative to one another to define a radial spacer between the clamping members.

11. A fan containment system according to claim 10, wherein the shims of each said pair are arranged relative to one another such that the radial spacer which they cooperate to define between the clamping members has a radial dimension which is less than the local radial thickness of the adjacent hook.

12. A fan containment system according to claim 11, wherein said radial dimension of each radial spacer defined by the cooperating shims is effective to position the second clamping member such that a radially innermost surface of the second clamping member is aerodynamically flush with a radially innermost surface of the hook and/or a radially innermost surface of the fan track liner when the hook is clamped between the first and second clamping members.

13. A fan containment system according to claim 10, the system having a plurality of said pairs of cooperating shims, said pairs of shims being circumferentially spaced-apart around the fan case.

14. A fan containment system according to claim 13, wherein each pair of shims is substantially identical to each other pair of shims.

15. A fan containment system according to claim 14, wherein the shims of each pair are arranged relative to one another independently of the shims of each other pair, such that the radial thickness of each radial spacer defined by a respective pair of shims is set independently to thereby accommodate any circumferential variation in the radial thickness of the hook.

16. A fan containment system according to claim 10, wherein each of the shims of each pair is circumferentially tapered.

17. A fan containment system according to claim 16, wherein the shims of each said pair are configured for circumferential movement relative to one another prior to the hook being clamped between the clamping members, to thereby adjust the radial thickness of the radial spacer defined by the shims.

18. A fan containment system for fitment around an array of radially extending fan blades mounted on a hub in an axial gas turbine engine, the fan containment system comprising:
   a fan case having an annular casing element for encircling the array of fan blades and a hook projecting in a generally radially inward direction from the annular casing element and positioned axially forward of the array of fan blades when the fan containment system is fitted around the array of fan blades;
   an annular fan track liner positioned substantially coaxial to the annular casing element; and
   a clamp having a first jaw opposing a second jaw, the hook being clamped between the first and second jaws,
   wherein the first jaw is connected to the second jaw via one or more fasteners that are axially spaced rearwardly from all portions of the hook, wherein the clamp is connected to the fan track liner or defines at least a portion of the fan track liner, such that under normal running conditions the clamp substantially fixes the radial position of the fan track liner with respect to the hook, and wherein under the condition that a released fan blade impacts the fan track liner, the second jaw is configured to fail so that at least a portion of the fan track liner can move towards the annular casing element so as to encourage the released fan blade to impact the hook.

19. A gas turbine engine comprising the fan containment system according to claim 1.

* * * * *